(12) United States Patent
Noble et al.

(10) Patent No.: US 11,300,689 B2
(45) Date of Patent: Apr. 12, 2022

(54) SYSTEM AND METHOD FOR RECONVERGING GNSS POSITION ESTIMATES

(71) Applicant: Swift Navigation, Inc., San Francisco, CA (US)

(72) Inventors: Fergus MacPherson Noble, San Francisco, CA (US); Sébastien Carcanague, San Francisco, CA (US); Paul Grgich, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 17/176,671

(22) Filed: Feb. 16, 2021

(65) Prior Publication Data

US 2021/0255336 A1 Aug. 19, 2021

Related U.S. Application Data

(60) Provisional application No. 62/977,005, filed on Feb. 14, 2020.

(51) Int. Cl.
| | | |
|---|---|---|
| *G01S 19/44* | (2010.01) | |
| *G01S 19/04* | (2010.01) | |
| *G01S 19/08* | (2010.01) | |
| *G01S 19/07* | (2010.01) | |
| *G01S 19/45* | (2010.01) | |

(52) U.S. Cl.
CPC .............. *G01S 19/44* (2013.01); *G01S 19/04* (2013.01); *G01S 19/074* (2019.08); *G01S 19/08* (2013.01); *G01S 19/45* (2013.01)

(58) Field of Classification Search
CPC ........ G01S 19/04; G01S 19/074; G01S 19/08; G01S 19/44; G01S 19/45
See application file for complete search history.

(56) References Cited

U.S. PATENT DOCUMENTS

| | | |
|---|---|---|
| 5,610,614 A | 3/1997 | Talbot et al. |
| 6,427,122 B1 | 7/2002 | Lin |
| 6,453,237 B1 | 9/2002 | Fuchs et al. |
| 6,691,066 B1 | 2/2004 | Brodie |
| 6,856,905 B2 | 2/2005 | Pasturel et al. |
| 6,864,836 B1 | 3/2005 | Hatch et al. |

(Continued)

FOREIGN PATENT DOCUMENTS

| | | |
|---|---|---|
| EP | 0244091 A2 | 11/1987 |
| EP | 1839070 B2 | 4/2014 |
| EP | 2966477 A1 | 1/2016 |

OTHER PUBLICATIONS

C. E. Rasmussen & C. K. I. Williams, Gaussian Processes for Machine Learning, the MIT Press, 2006, ISBN 026218253X. c 2006 Massachusetts Institute of Technology. (Year: 2006).

(Continued)

*Primary Examiner* — Dao L Phan
(74) *Attorney, Agent, or Firm* — Jeffrey Schox; Randy Mehlenbacher

(57) ABSTRACT

A system and method for determining a receiver position can include determining a receiver position based on a set of satellite observations, determining the receiver position based on sensor measurements, determining a satellite observation discontinuity; based on the satellite observation discontinuity, determining a second receiver position.

12 Claims, 9 Drawing Sheets

(56) References Cited

U.S. PATENT DOCUMENTS

| | | | |
|---|---|---|---|
| 7,026,982 B2 | 4/2006 | Toda et al. | |
| 7,219,013 B1 | 5/2007 | Young et al. | |
| 7,289,061 B2 | 10/2007 | Komjathy et al. | |
| 7,292,183 B2 | 11/2007 | Bird et al. | |
| 7,696,922 B2 | 4/2010 | Nicholson et al. | |
| 8,094,065 B2 | 1/2012 | Henkel | |
| 8,193,976 B2 | 6/2012 | Shen et al. | |
| 8,447,517 B2 | 5/2013 | Roh | |
| 8,610,624 B2 | 12/2013 | Savoy | |
| 8,756,001 B2 | 6/2014 | Georgy et al. | |
| 8,760,343 B2 | 6/2014 | Milyutin et al. | |
| 8,825,456 B2 | 9/2014 | Vasudevan et al. | |
| 8,860,609 B2 | 10/2014 | Roh | |
| 8,996,311 B1 | 3/2015 | Morin et al. | |
| 9,069,073 B2 | 6/2015 | Ramakrishnan et al. | |
| 9,128,176 B2 | 9/2015 | Seeger | |
| 9,182,497 B2 | 11/2015 | Geier et al. | |
| 9,405,012 B2 | 8/2016 | Doucet et al. | |
| 9,405,016 B2 | 8/2016 | Yim | |
| 9,557,422 B1 | 1/2017 | Miller et al. | |
| 9,602,974 B2 | 3/2017 | Rudow et al. | |
| 9,709,683 B2 | 7/2017 | Leandro et al. | |
| 9,784,844 B2 | 10/2017 | Kana et al. | |
| 10,677,933 B1 | 6/2020 | Gavrilets et al. | |
| 10,809,388 B1* | 10/2020 | Carcanague | G01S 19/44 |
| 2005/0001762 A1 | 1/2005 | Han et al. | |
| 2005/0001763 A1* | 1/2005 | Han | G01S 19/44 342/357.31 |
| 2005/0024263 A1 | 2/2005 | Sharpe et al. | |
| 2009/0184869 A1 | 7/2009 | Talbot et al. | |
| 2010/0164789 A1 | 7/2010 | Basnayake | |
| 2011/0148698 A1 | 6/2011 | Vollath | |
| 2011/0187589 A1 | 8/2011 | Gaal et al. | |
| 2012/0154210 A1 | 6/2012 | Landau et al. | |
| 2012/0176271 A1 | 7/2012 | Dai et al. | |
| 2013/0050020 A1 | 2/2013 | Peck et al. | |
| 2013/0234885 A1* | 9/2013 | Geier | G01S 19/44 342/357.23 |
| 2014/0184442 A1 | 7/2014 | Large et al. | |
| 2014/0240172 A1 | 8/2014 | Milyutin et al. | |
| 2015/0293233 A1 | 10/2015 | De Jong | |
| 2016/0097859 A1 | 4/2016 | Hansen et al. | |
| 2016/0195617 A1 | 7/2016 | Phatak et al. | |
| 2017/0269222 A1 | 9/2017 | Dai et al. | |
| 2017/0299730 A1 | 10/2017 | Lie et al. | |
| 2017/0322313 A1 | 11/2017 | Revol et al. | |
| 2018/0113219 A1 | 4/2018 | Wuebbena | |
| 2018/0120445 A1 | 5/2018 | Dill | |
| 2018/0299562 A1 | 10/2018 | Green | |
| 2019/0004180 A1 | 1/2019 | Jokinen | |
| 2019/0204450 A1 | 7/2019 | Revol | |
| 2019/0339396 A1 | 11/2019 | Turunen | |
| 2020/0209406 A1 | 7/2020 | Lin et al. | |

OTHER PUBLICATIONS

Huang, P. "Airborne GNSS PPP Based Pseudolite System." School of Civil and Environmental Engineering Faculty of Engineering UNSW. Jun. 2019. (Year: 2019).

Ming Lin, Xiaomin Song, Qi Qian, Hao Li, Liang Sun, Shenghuo Zhu, Rong Jin:Robust Gaussian Process Regression for Real-Time High Precision GPS Signal Enhancement. Jun. 5, 2019. (Year: 2019).

Satirapod, C. "Improving the GPS Data Processing Algorithm for Precise Static Relative Positioning." School of Surveying and Spatial Information Systems The University of New South Wales. Jan. 2002 . (Year: 2002).

Takasu,Tomoji "ION GNSS 2008 abstract submission Cycle slip detection and fixing by MEMS IMU/GPS integration for mobile environment RTK-GPS" Tokyo University of Marine Science and Technology.

Yang,Wenhao "An Improved Relative GNSS Tracking Method Utilizing Single Frequency Receivers" Sensors 2020, 20, 4073; doi:10.3390/s20154073 www.mdpi.com/journal/sensors, 19 pages.

"An Introduction to GNSS, Chapter 4, GNSS Error Sources", https://novatel.com/an-introduction-to-gnss/chapter-4-gnsserror-sources, published 2015.

"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.

Brocard, Philippe , "Integrity monitoring for mobile users in urban environment", https://tel.archives-ouvertes.fr/tel-01379632, Oct. 11, 2016.

Chiu, David S. , et al., "Bierman-Thorton UD Filtering for Double-Differenced Carrier Phase Estimation Accounting for Full Mathematical Correlation", Jan. 2008, ION NTM 2008, pp. 756-762., Jun. 23, 2017 00:00:00.0.

Gratton, Livio , et al., "Carrier Phase Relative RAIM Algorithms and Protection Level Derivation", Journal of Navigation (2010), 63, 215-231, doi: 10.1017/S0373463309990403.

Gunning, Kazuma , et al., "Design and evaluation of integrity algorithms for PPP in kinematic applications", Proceedings of the 31st International Technical Meeting of the Satellite Division of The Institute of Navigation (ION GNSS+ 2018) Sep. 24-28, 2018, Hyatt Regency Miami, Miami, Florida.

Karaim, Malek , et al., "GNSS Error Sources", https://www.intechopen.com/books/multifunctional-operation-and-application-of-gps/gnss-error-sources, published Apr. 6, 2018.

Khanafseh, Samer , et al., "GNSS Multipath Error Modeling for Automotive Applications", Abstract only, Proceedings of the 31st International Technical Meeting of the Satellite Division of The Institute of Navigation (ION GNSS+ 2018), Miami, Florida, Sep. 2018, pp. 1573-1589, https://www.ion.org/publications/abstract.cfm?articleID=16107.

Li, T. , et al., "Some remarks on GNSS integer ambiguity validation methods", Survey Review, Dec. 5, 2012, vol. 44, No. 326.

Pervan, Boris , et al., "Shaping Aviation Integrity Two RAIMs for Safety", GPS World The Business and Technology of Global Navigation and Positioning, Apr. 1, 2008.

Pullen, Sam , "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.

Teunissen, P.J.G., "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.

Teunissen, Peter J.G., et al., "Integer Aperture Estimation A Framework for GNSS Ambiguity Acceptance Testing", InsideGNSS, Mar./Apr. 2011, pp. 66-73, www.insidegnss.com.

Thombre, Sarang , et al., "GNSS great Monitoring and Reporting: Past, Present, and a Proposed Future", The Journal of Navigation, Dec. 2017, DOI: 10.1017/S0373463317000911, https://www.researchgate.net/publication/321663256.

Urquhart, Landon , et al., "Innovation: Integrity for safe navigation", https://www.gpsworld.com/innovation-integrity-for-safe-navigation-provided-by-gnss-service/, GPS World, Feb. 12, 2020.

Van Graas, Frank , et al., "Precise Velocity Estimation Using a Stand-Alone GPS Receiver", Abstract only, Journal of The Institute of Navigation, vol. 51, No. 4, Winter 2004-2005, pp. 283-292, https://www.ion.org/publications/abstract.cfm?articleID=102384.

Zhu, Ni , et al., "GNSS Position Integrity in Urban Environments: A Review of Literature", IEEE Transactions on Intelligent Transportation Systems, 2018, 17p., 10.1109/TITS.2017.2766768.hal-01709519.

"Integrity-Navipedia", https://gssc.esa.int/navipedia/index.php/Integrity, published 2011.

Altmayer, Christian , "Cycle Slip Detection and Correction by Means of Integrated Systems", ION Institute of Navigation, Proceedings of the 200 National Technical Meeting of the Institute of Navigation, Abstract, Jan. 26-28, 2000.

(56) References Cited

OTHER PUBLICATIONS

Davidson, Pavel, et al., "Improved Vehicle Positioning in Urban Environment through Integration of GPS and Low-Dost Inertial Sensors", European Navigation Conference, ENC-GNSSAt: Naples, Italy, May 2009.

Favey, Etienne, et al., "Dead reckoning fills-in GPS navigation gap", EE Times, Automotive Designline, Aug. 18, 2011.

Kilic, Cagri, et al., "ZUPT Aided GNSS Factor Graph with Inertial Navigation Integration for Wheeled Robots", Proceedings of the 34th International Technical Meeting of the Satellite Division of The Institute of Navigation (ION GNSS+ 2021) Sep. 20-24, 2021.

Kissai, Ali, et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.

Lee, Jae Ho, et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.

Meng, Xiaoli, et al., "A Robust Vehicle Localization Approach Based on GNSS/IMU/DMI/LiDAR Sensor Fusion for Autonomous Vehicles", Sensors, 2017, 17, 2140.

Rodriguez-Solano, Carlos, et al., "Protection Level of the Trimble RTX Positioning Engine for Autonomous Applications", Proceedings of the 34th International Technical Meeting of the Satellite Division of The Institute of Navigation (ION GNSS+ 2021), Sep. 20-24, 2021.

Skog, Isaac, et al., "A Low-Cost GPS Aided Inertial Navigation System for Vehicle Applications", 2005 13th European Signal Processing Conference, Sep. 4-8, 2005.

Subirana, J. Sanz, et al., "Carrier Phase Cycle-Slip Detection—Navipedia", https://gssc.esa.int/navipedia/index.php/Carrier_Phase_Cycle-Slip_Detection, published 2011.

\* cited by examiner

SYSTEM AND METHOD FOR RECONVERGING GNSS POSITION ESTIMATES

CROSS-REFERENCE TO RELATED APPLICATIONS

This application claims the benefit of U.S. Provisional Application No. 62/977,005, filed 14 Feb. 2020, which is incorporated in its entirety by this reference.

TECHNICAL FIELD

This invention relates generally to the satellite positioning field, and more specifically to a new and useful system and method in the satellite positioning field.

BACKGROUND

Global navigation satellite systems (GNSS) can be used to determine the location of a receiver to a high degree of accuracy and with a high degree of integrity. Typically, GNSS solutions lock on to a carrier phase. However, GNSS solutions can lose the lock, for example, because of receiver dynamics and/or errors (e.g., tracking errors). Typically, after losing the lock, the receiver needs to be restarted to reconverge on the receiver location. Restarting the calculation and reestablishing lock can take a long time, during which the receiver position is poorly known (e.g., known with insufficient integrity to use). Thus, there is a need in the satellite positioning field to create a new and useful system and method. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
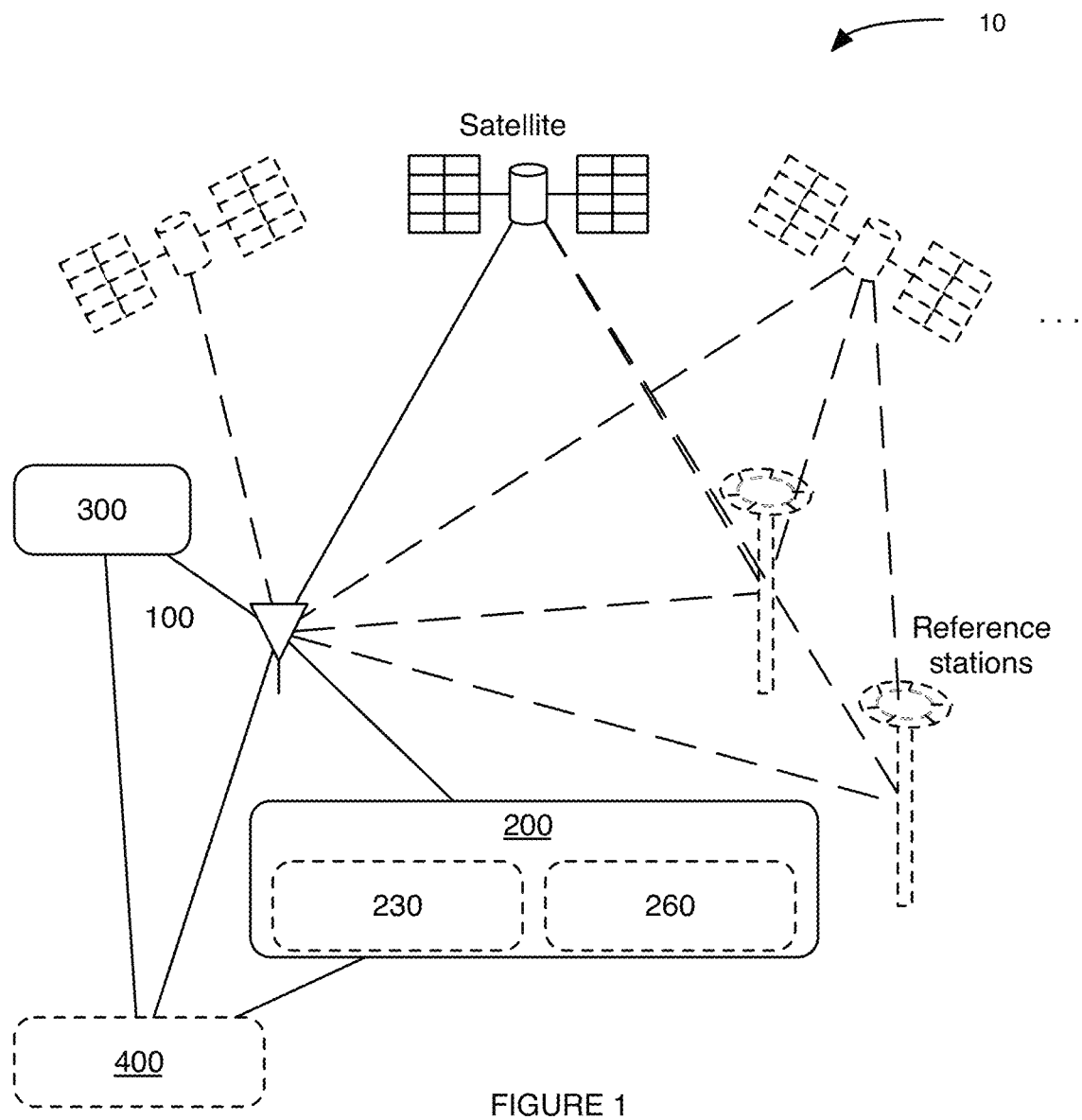
FIG. 1 is a schematic representation of the system.

As shown in FIG. 1, the system can include one or more receivers, one or more sensors, and a computing system. The system can optionally include one or more reference stations, and/or any suitable components. The computing system can include: a corrections engine, a positioning engine, and/or any suitable components.

Figure 3:
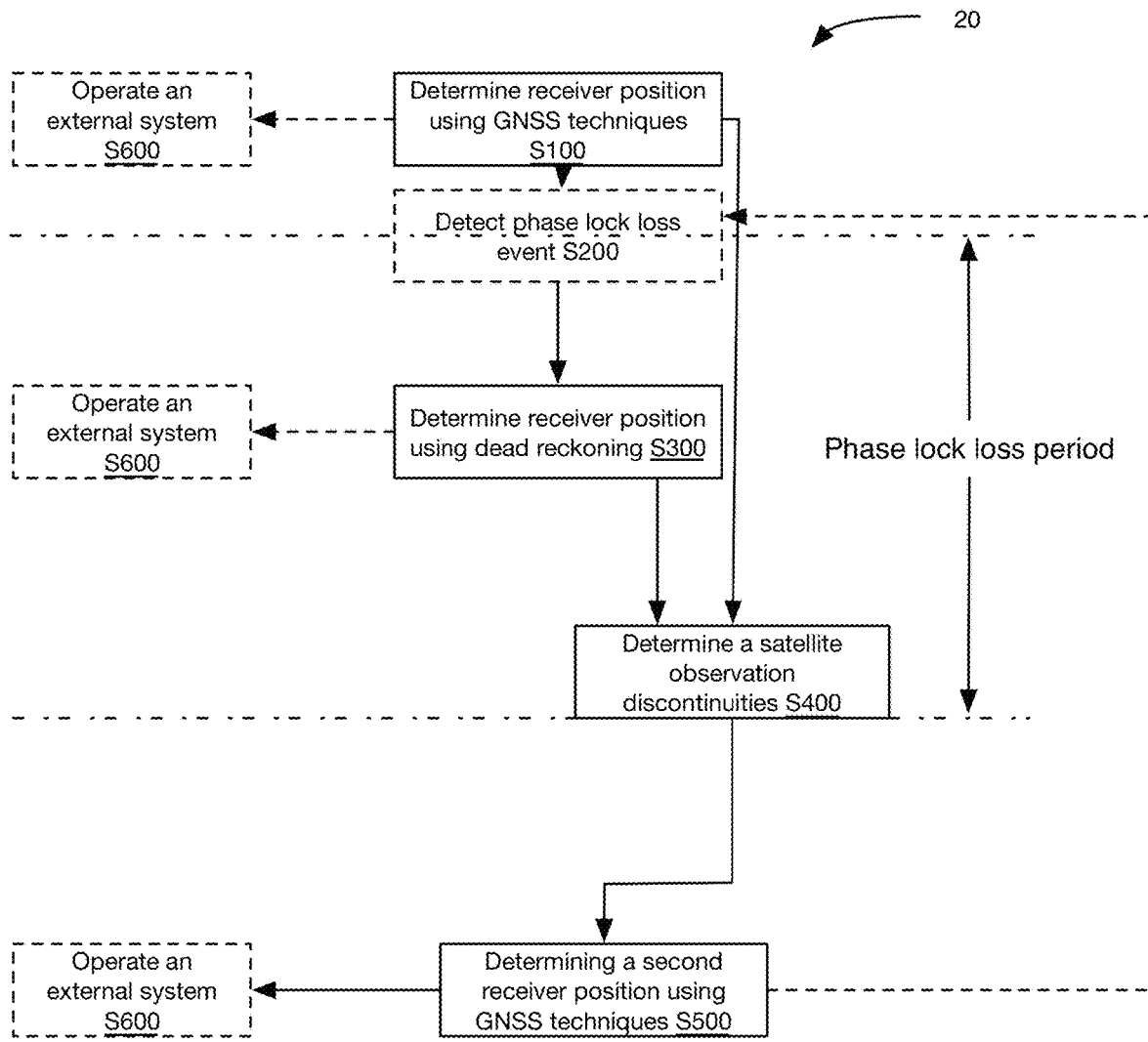
FIG. 3 is a schematic representation of the method.

As shown in FIG. 3, a method for determining a receiver position includes determining the receiver position using GNSS techniques S100, determining the receiver position using dead reckoning S300, determining one or more satellite observation discontinuity parameter S400. The method can optionally include detecting a phase-lock loss event S200, using the receiver position to operate an external system S600, and/or any suitable steps.

Figure 5A:
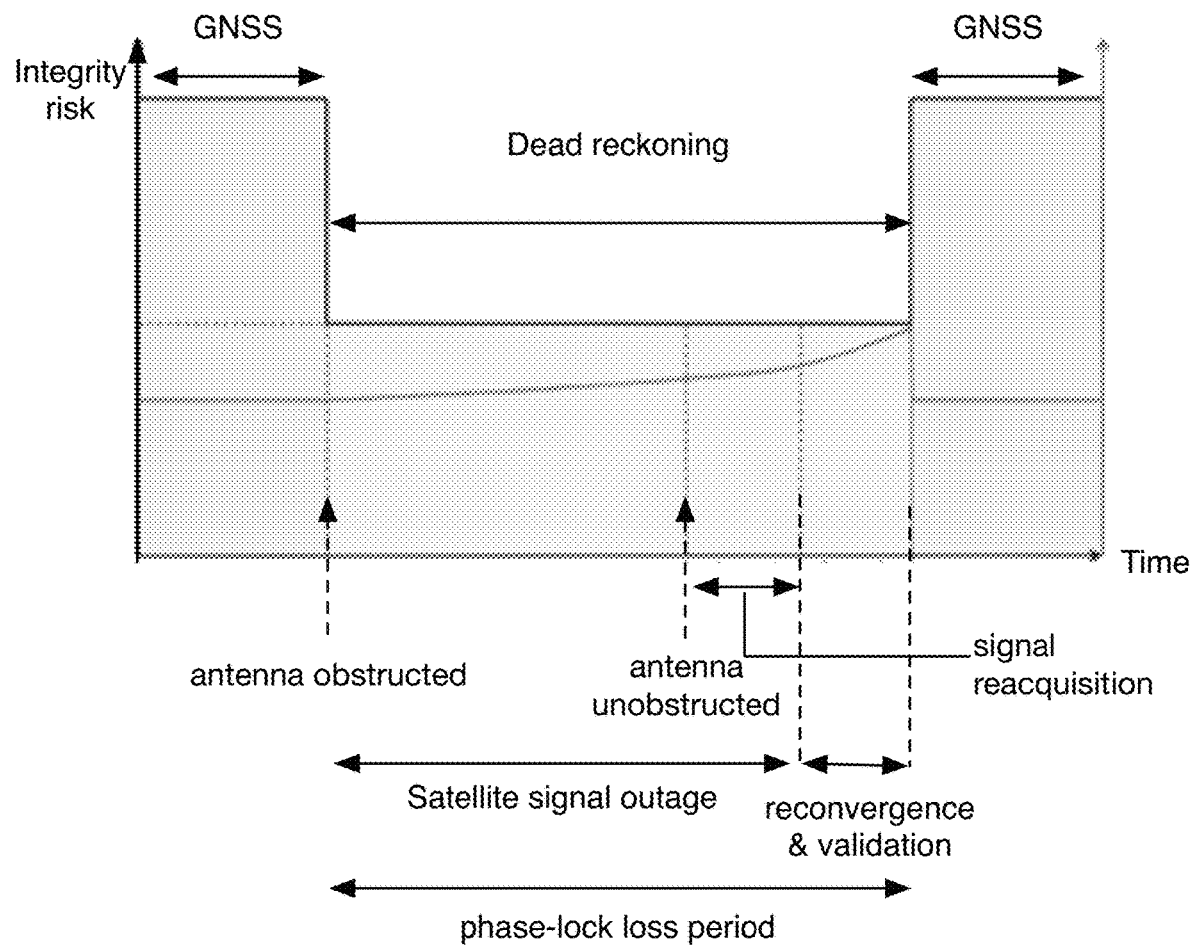
FIGS. 5A and 5B are schematic representations of examples of the integrity risk (IR) and protection level (PL) before measurement engine outage (e.g., GNSS outage), during measurement engine outage, during reconvergence, and after reconvergence.
Figure 5B:
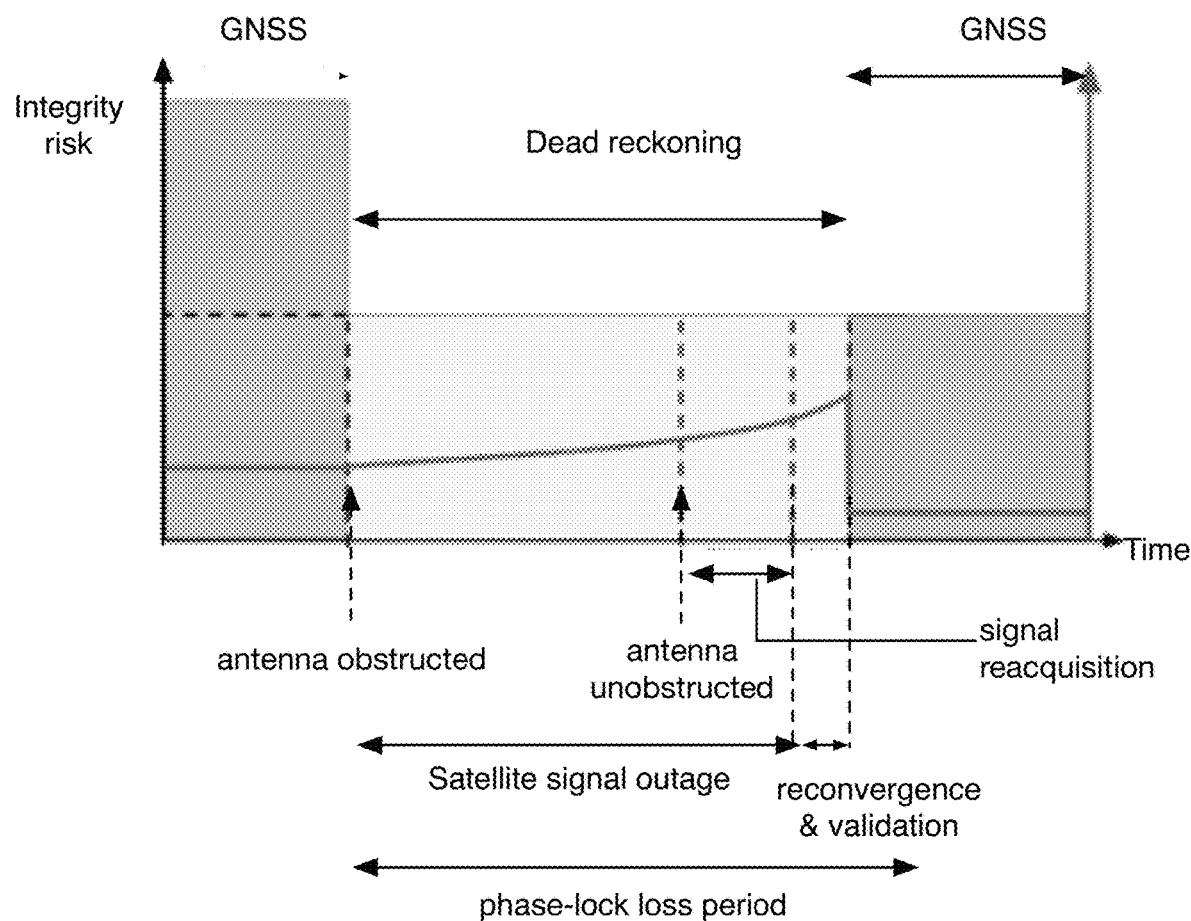

Embodiments of the system and/or method preferably function to rapidly determine the position of a receiver to a high degree of accuracy and integrity after a phase-lock loss event occurs. Examples of a phase-lock loss events include: outages (e.g., power loss to the receiver, satellite failure, etc.), obscurations events (e.g., partial and/or complete obscuration such as preventing the receiver from receiving satellite signals corresponding to one or more satellites), blockages, interruptions, corrupted information (e.g., transmitted by the satellites), lost connectivity (e.g., to a remote computing system), and/or any event that causes the receiver position to be indeterminant using GNSS signals. The phase-lock loss event can be a discrete event and/or continuous event (e.g., persists for an amount of time). The phase-lock loss event can cause the GNSS signal and/or GNSS receiver position determination to be suspended for a phase-lock loss period. The phase-lock loss period is preferably short (e.g., <1 s, <2 s, <5 s, <10 s, <20 s, <30 s, etc.), but can be any duration (e.g., >30 s). In some examples, the phase-lock loss period can be considered as including different parts. In a specific variant of these examples as shown in FIGS. 5A and 5B, the phase-lock loss period can include a satellite signal outage, an obscuration time (e.g., time during which the receiver cannot acquire satellite signals), a reacquisition time (e.g., a time during which the receiver is acquiring satellite signals), and a reconvergence time (e.g., a processing time to determine the receiver position from the satellite signals). However, the phase-lock loss period can be a unified time, and/or divided in any suitable manner.

The accuracy of the determined receiver position can be within 1 mm to 10 m such as 1 cm, 5 cm, 10 cm, 20 cm, 30 cm, 50 cm, 1 m, 2 m, 5 m. However, the system and method can achieve an accuracy of less than 1 mm, greater than 10 m, and/or any suitable accuracy.

The integrity of the determined receiver position can include the concept of real- or near-real time error estimation (as opposed to a posteriori error calculation). Based on this real-time error estimation, positioning systems with integrity can provide alerts when positioning error likely exceeds error thresholds. Parameters describing the positioning system's integrity can include: position error (PE), integrity risk (e.g., an inverse of the probability of a failure event, probability that position error will exceed some threshold (the alert limit) over some time period, etc.), protection level (PL), alert limit (AL), time to alert (TTA), and/or any suitable integrity parameters. Instances of integrity herein can refer to one or more integrity parameters and/or to any suitable integrity of the receiver position. Real- or near-real time error estimation can occur within a predetermined estimation time (e.g., 100 ms, 1 s, 2 s, 3 s, 4 s, 5 s, 10 s, 20 s, 30 s, 45 s, 60 s, 90 s, 120 s, 180 s, 240 s, 300 s, 600 s, values therebetween etc.), "fast enough to be used during navigation," and/or with any suitable timing.

The receiver position is preferably determined with a high integrity, but can be determined to a moderate integrity, a low integrity, an integrity that depends on the application, an integrity that depends on the external system, without determining an integrity, and/or to any suitable integrity. For example, a high integrity receiver position can have a target integrity risk (TIR) between $10^{-10}$/hr and $10^{-2}$/hr such as $10^{-3}$/hr, $10^{-4}$/hr, $10^{-5}$/hr, $10^{-6}$/hr, $10^{-7}$/hr, $10^{-8}$/hr, $10^{-9}$/hr, or values therebetween. However, the TIR can be greater than $10^{-2}$/hr, less than $10^{-10}$/hr, and/or any suitable TIR. In a second example, a high integrity receiver position can have a protection level than about 10 meters, such as at most 5 m, 3 m, 2 m, 1 m, 75 cm, 50 cm, 40 cm, 30 cm, 25 cm, 20 cm, 10 cm, 5 cm, 3 cm, 1 cm, 5 mm, and/or 1 mm. However, the protection level can be greater than 10 meters and/or any suitable value. However, a high integrity receiver position can be otherwise specified.

In variants, the system and/or method can achieve more than one integrity level. The different integrity levels can correspond to different degrees of accuracy, integrity, speed of convergence (and/or reconvergence), and/or any suitable metric. In a specific example, the system and/or method can include two levels, a high-integrity level and a mid-integrity level corresponding to integrity risk $10^{-7}$/hour and $10^{-4}$/hour respectively. In this example, the high-integrity level can converge within 2 seconds, and the mid-integrity level can converge in 1 second, but the modes can converge in any suitable amount of time. The system can select the integrity level to be used (e.g., selected by the external system, based on the use case, based on the receiver context, such as velocity, based on a specified target integrity risk (TIR), etc.) or have a predetermined integrity level.

Embodiments of the technology can be used in combination with an external system 400. For example, embodiments of the technology can be coupled to and/or integrated with the external system. In specific examples, the external system can include unmanned aerial vehicles (UAVs), unmanned aerial systems (UAS), self-driving cars, agricultural equipment, robotics, rail transport systems, rail transit systems, global navigation satellite system (GNSS) research, surveying systems, and/or any suitable external systems. In these embodiments, the technology can be used (e.g., as inputs for) to control the operation of the external system, for external system guidance (e.g., ensure that the external system is travelling in the correct direction), and/or for any suitable purpose.

2. Benefits

Variations of the technology can confer several benefits and/or advantages.

First, variants of the technology can reconverge on a receiver position after a satellite signal outage faster than other GNSS technologies. For example, the use of dead reckoning to estimate a receiver position during an event (e.g., the satellite signal outage, phase lock loss, etc.) can enable the technology to quickly reconverge on the receiver position after the event has ended. In a specific example, the method bootstraps reconvergence by leveraging the estimated receiver position during the outage (e.g., dead reckoning position; used to estimate the position change) and the buffered set of consecutive carrier signals (e.g., used to determine the estimated carrier phase displacement during the outage) to cooperatively determine the cycle slip (e.g., integer ambiguity jump during the outage). In a second example, the short reconvergence time can be enabled by using a plurality of validators running in parallel.

Second, variants of the technology can provide various levels of integrity for the receiver position depending on the application requirements. In specific examples, the technology can determine integrity to one or more integrity levels. In variants of these examples, the different levels can require different amounts of time to converge (and/or reconverge).

Third, variants of the technology can provide a self-consistent check for the integrity of the solution for the receiver position. In specific examples, the technology can provide independent data sets to different processing modules and compare the results across those processing modules. This comparison across results can be used as an internal verification of the integrity of the receiver position solution.

However, variants of the technology can confer any other suitable benefits and/or advantages.

3. System

The system preferably functions to determine the position of a receiver. In particular, the system can function to redetermine the position of a receiver (e.g., after phase-lock loss event, after an obscuration event, using buffered receiver position determination, etc.), but the system can determine the receiver position at any suitable time. The position of the receiver is preferably redetermined within a predetermined time after the phase-lock loss event (e.g., obscuration event) has ended (e.g., within 20 s, 10 s, 5 s, 2 s, 1 s, etc.), but the position of the receiver can be determined at any suitable time. The reconvergence time is preferably short (e.g., <1 s, <2 s, <5 s, <10 s, <20 s, etc.), but can be any suitable duration of time.

The system preferably uses a set of data collected by one or more data sources. Data sources can include: receivers, sensors (e.g., located onboard the receiver, the external system, the reference stations, etc.), databases, satellites, reference stations, and/or any other suitable data source. Examples of data that can be used include: satellite observations, sensor observations, reference station observations, and/or any other suitable data.

The receiver 100 (e.g., GNSS receiver, antenna preferably functions to receive a set of satellite observations (e.g., satellite signals) from one or more satellites. In variants, the receiver can determine the location (e.g., by using pseudorange, by using carrier phase, by using code data, etc.) of the receiver (e.g., the receiver antenna, the external system, etc.) based on the satellite observations. The receiver is preferably in communication with the computing system. However, the receiver can be integrated with the computing system, and/or the receiver and computing system can be arranged in any suitable manner. The receiver is preferably a stand-alone device (e.g., a GNSS receiver, antenna). However, the receiver can be integrated into the external system (e.g., be a component of an automobile, aero vehicle, nautical vehicle, etc.), can be a user device (e.g., smart phone, laptop, cell phone, smart watch, etc.), and/or can be configured in any suitable manner.

The set of satellite observations can include orbital data, timestamp, range rate data, carrier phase data, pseudorange data, and/or any suitable data. The set of satellite observations can be associated with metadata (e.g., ephemeris), and/or any suitable data. The set of satellite observations preferably includes satellite observations corresponding to satellites from more than one satellite constellation (e.g., Global Positioning System (GPS), GLObal Navigation Satellite System (GLONASS), BeiDou positioning System (BDS), Galileo, etc.). However, the set of satellite observations can correspond to satellites from a single satellite constellation, can include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), Omnistar, StarFire, etc.; Ground Based Augmentation Systems (GBAS) such as Local Area Augmentation System (LAAS); etc.), and/or can include any suitable data.

In variants of the system including more than one receiver, each receiver can be configured to receive satellite observations associated a satellite constellation, a carrier frequency (e.g., the $L_1$, $L_2$, $L_5$, $E_1$, $E_{5a}$, $E_{5b}$, Eab, $E_6$, $G_1$, $G_3$, $B_1$, $B_2$, $B_3$, LEX, etc. frequencies), and/or corresponding to any suitable data.

The sensors 300 preferably function to measure sensor data (e.g., auxiliary data) associated with the external system (and/or the GNSS receiver). The sensor data is preferably used to determine (e.g., independent of the satellite observations) the external system position, but can additionally or alternatively be used to assist (e.g., speed-up, correct, refine, converge, reconverge, etc.) the calculation (e.g., calculating the state vector, estimating the phase ambiguity) of position from the satellite observations and/or be otherwise used. The sensors are preferably in communication with the computing system. The sensors can be: on-board the external system, on-board a separate external system, integrated into the GNSS receiver, separate from the GNSS receiver, and/or otherwise associated with the receiver or external system. The sensor data can include: inertial data (e.g., velocity, acceleration, angular velocity, angular acceleration, etc.), odometry (e.g., wheel tick, visual odometry, etc.), pose (e.g., position, orientation), mapping data (e.g., images, point clouds), temperature, pressure, ambient light, and/or any other suitable data. The sensors can include one or more of: inertial measurement unit (IMU), accelerometer, gyroscope, magnetometer, odometer (e.g., wheel speeds; wheel ticks; steering angles; visual odometers such as cameras; etc.), pressure sensors, and/or any suitable sensor.

The system can include more than one GNSS receiver and/or sensor, which can function to provide redundancy, provide information in the event of an outage to one of the GNSS receivers or sensors, provide validation and/or cross checks between data sources, and/or otherwise function. The relative pose between each GNSS receiver (e.g., between each GNSS receiver antenna), each sensor, and/or each GNSS receiver/sensor pair is preferably known, but can be unknown.

The computing system 200 preferably functions to perform the steps of the method (e.g., as described below); to process the data (e.g., satellite observations) from the receiver, the reference stations, and/or the sensors; and/or can otherwise function. The computing system can: aggregate the data (e.g., combine the receiver satellite observations, reference station satellite observations, and sensor data; reorganize the receiver satellite observations, reference station satellite observations, and sensor data such as based on the time stamp, time of transmission, time of receipt, etc.; etc.), filter the data (e.g., to calculate state vectors, ambiguities such as phase ambiguities, etc. associated with the data), calculate the receiver position (e.g., based on the ambiguities), correct the data (e.g., correct the satellite observations for clock errors, hardware bias, atmospheric effects, etc.), and/or can process the data in any suitable manner. The computing system can be local (e.g., on-board the external system, integrated in a receiver, integrated with a reference station, etc.), remote (e.g., cloud computing, server, networked, etc.), and/or can be distributed.

The computing system is preferably communicably coupled to the receiver, to the reference station, and to the sensors, but the computing system can be in communication with any suitable components. In variants as shown in FIG. 1, the computing system can include: a corrections engine 230, a positioning engine 260, and/or any suitable components. In an illustrative example, a corrections engine can be part of a remote computing system (e.g., server) and the positioning engine can be part of a local computing system (e.g., integrated in the external system, integrated in the GNSS receiver, collocated with the GNSS receiver, etc.). However, the corrections engine and/or positioning engine can be otherwise distributed.

The corrections engine functions to generate corrections (e.g., correction data) to be used by the positioning engine (and/or the GNSS receiver) and/or to determine a reliability of the corrections (e.g., validate the corrections). The corrections are preferably used to improve the accuracy and/or integrity of the estimated position and/or velocity. The corrections may take the form of PPP corrections, RTK corrections, Satellite-Based Augmentation System (SBAS) corrections, or any other type of corrections. The corrections can be used to correct the satellite observations (e.g., as measured by the GNSS receiver), to facilitate carrier phase determination (e.g., by the carrier phase determination module), to facilitate detection of outliers (e.g., at an outlier detector), to facilitate determination of predetermined events, and/or in any suitable manner.

In a specific example, the corrections engine can operate in a manner as described in U.S. patent application Ser. No. 17/022,924 filed on 16 Sep. 2020 and titled "SYSTEMS AND METHODS FOR HIGH-INTEGRITY SATELLITE POSITIONING," incorporated in its entirety by this reference. However, the corrections engine can operate in any manner.

The positioning engine 260 functions to estimate the position of the GNSS receiver and/or an external system coupled to the GNSS receiver. The positioning engine preferably takes as input satellite observations (e.g., sets of satellite observations) from the receiver (or other GNSS data source) and corrections (e.g., corrections data) from the corrections processing engine to generate the estimated position (e.g., position data). However, the positioning engine can additionally or alternatively take sensor data, reference station observations, satellite observations from other GNSS receivers, and/or any data or information input(s). The positioning engine preferably outputs an estimated position and an integrity of the estimated position (e.g., a protection limit, an integrity risk, etc.). However, the positioning engine can additionally or alternatively output a dead reckoning position (e.g., a position of the GNSS receiver and/or the external system derived from sensor data), sensor bias, and/or any suitable data. The positioning engine is preferably communicably coupled to the GNSS receiver, the corrections processing engine, and the sensor(s), but can additionally or alternatively be communicably coupled to reference stations, and/or any suitable component(s).

Figure 7:
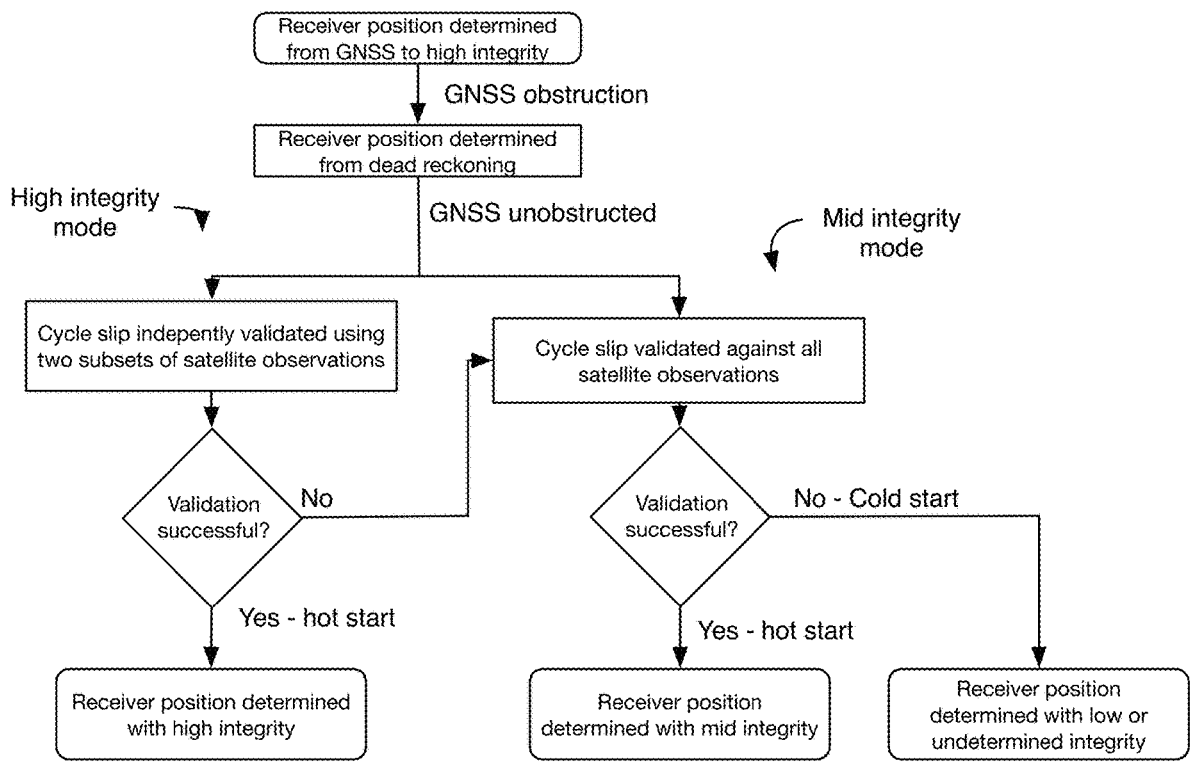
FIG. 7 is a flow chart representation of an example of different validation levels.

In some variants of the positioning engine, the positioning engine can operate in two or more modes. The positioning engine can operate in the modes simultaneously or be operable in a single mode at a time. The modes can include: GNSS positioning mode, dead reckoning positioning mode, high integrity mode, medium integrity mode, low integrity mode, integrity unspecified mode, and/or any suitable modes. In an illustrative example as shown in FIG. 7, the positioning engine can operate in a high integrity mode and a low integrity mode simultaneously. In the high integrity mode, the positioning engine can function to try to achieve a high integrity (e.g., TIR<$10^{-7}$/hr, PL of about 3 m, etc.) after a phase lock loss event (e.g., based on sensor data acquired during the phase lock loss period) and in the low integrity mode, the positioning engine can function to try to achieve a low integrity (e.g., TIR<$10^{-4}$/hr, PL of about 1 m, etc.) after a phase lock loss event (e.g., based on sensor data acquired during the phase lock loss period). In this specific example, when neither condition is achieved, the positioning engine can redetermine the GNSS receiver position (e.g., without leveraging the sensor data acquired during the phase lock loss duration). However, the positioning engine can be operable in any suitable mode(s).

Figure 2:
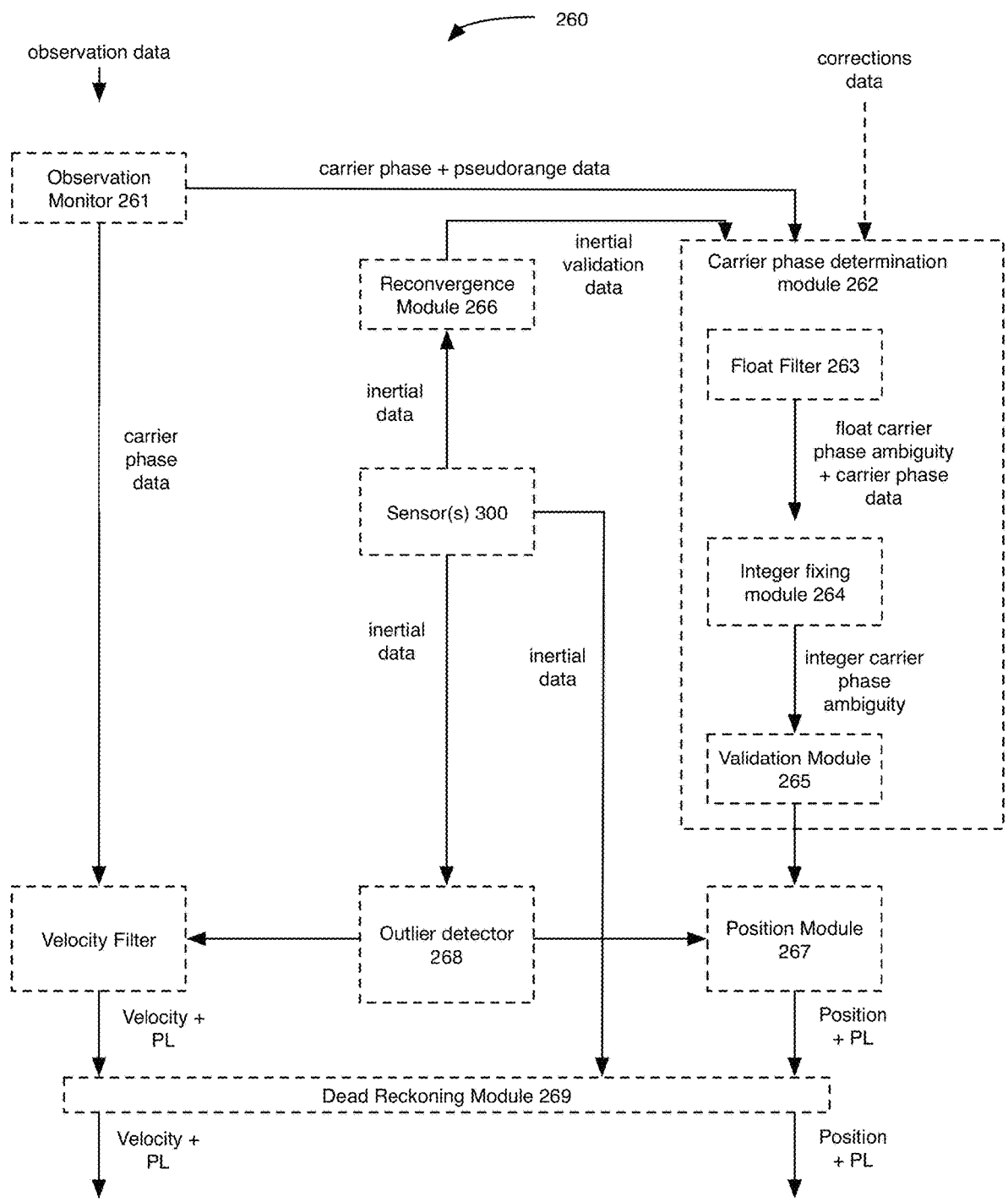
FIG. 2 is a schematic representation of an example of a positioning engine.

In a specific example as shown in FIG. 2, the positioning engine can include: an observation module 261 (e.g., observation monitor such as functional to check satellite observations for potential predetermined events and/or outliers), carrier phase determination module 262 (e.g., functional to determine a carrier phase ambiguity associated with the satellite observations), a reconvergence module 266 (e.g., functional to determine or estimate a cycle slip, multipath error, or other predetermined event that occurs during a phase lock loss event based on sensor data), an outlier detector 268 (e.g., functional to detect outliers in the satellite observations, mitigate an effect of outliers in the satellite observations, etc.), a position module 267 (e.g., a fixed-integer position filter functional to determine the receiver position, and/or associated integrity, based on the satellite observations such as based on carrier-phase ambiguity removed satellite observations), a velocity module (e.g., functional to determine the receiver velocity based on the satellite observations, time differenced carrier phase measurements, Doppler shift data, pseudorange, differential estimated position, etc.), a dead reckoning module 269 (e.g., functional to determine the GNSS receiver and/or external system position and/or velocity based on sensor data), and/or any suitable modules. However, one or more modules can be integrated with each other and/or the positioning engine can include any suitable modules.

In a specific example, the positioning engine (and/or components thereof) can operate in a manner as described in U.S. patent application Ser. No. 17/022,924 filed on 16 Sep. 2020 and titled "Systems and Methods for High-Integrity Satellite Positioning," incorporated in its entirety by this reference. However, the corrections engine can operate in any manner.

4. Method

As shown in FIG. 3, a method for determining a receiver position includes determining the receiver position using GNSS techniques S100, determining the receiver position using dead reckoning S300, determining one or more satellite observation discontinuity parameter S400, and determining the receiver position S500. The method can optionally include detecting a phase-lock loss event S200, using the receiver position to operate an external system S600, and/or any suitable steps. Typically, but not always, S100 is performed before a phase lock loss event has occurred, S300 and S400 are performed during a phase lock loss period, and S500 is performed after a phase lock loss period has ended. However, the steps can be performed at any suitable time relative to a phase lock loss event or period. The method is preferably performed iteratively (e.g., repeated whenever a phase lock loss event occurs), but can be performed continuously, intermittently (e.g., in response to a trigger, call, etc. for a receiver position determination; with a predetermined timing every 1 s, 5 s, 10 s, 20 s, etc.; every time signal is received from a data source; etc.), once, randomly, and/or with any suitable frequency and/or timing. The number of method iterations can be a predetermined number of phase lock loss events (e.g., a maximum of 1, 2, 5, 10, 20, 30, 50, 100, 200, 300, 500, 1000, 2000, 3000, 3600, times per hour etc.), an unlimited number, and/or with any suitable number of iterations. The number of iterations of the method can be performed can depend on the target integrity (e.g., target integrity risk, target protection level, etc.), the application, the external system, a target accuracy, a reconvergence time, a phase lock loss duration, and/or any suitable information. After the method has performed a number of iterations, the method can, instead of progressing to S500, repeating S100 after a phase lock loss event has ended and/or otherwise operate after the number of iterations.

The method functions to determine the position of a receiver (e.g., an external system coupled to the receiver) based on one or more sets of satellite observations. The method preferably determines the position of the receiver and/or one or more intermediates (e.g., state vector) used to determine the position of the receiver quickly (e.g., <30 s, <20 s, <10 s, <5 s, <2 s, <1 s, etc.) after a phase-lock loss event. However, the method can determine the receiver position with any suitable timing. One or more instances of the method and/or steps of the method can be performed in series and/or in parallel (e.g., concurrently).

Determining the receiver position using GNSS techniques S100 preferably functions to calculate the position of the receiver (and/or external system) based on the set of satellite observations. S100 preferably determined the receiver position to a high accuracy and integrity (e.g., integrity risk <$10^{-7}$/hr, <$10^{-6}$/hr, <$10^{-5}$/hr, <$10^{-4}$/hr, >$10^{-3}$/hr, etc.; accuracy <1 cm, <10 cm, <50 cm, <1 m, <10 m, etc.; etc.). S100 is preferably performed by the computing system (e.g., a positioning engine of the computing system); however, S100 can additionally and/or alternatively be performed by the receiver, a reference station, and/or by any suitable component.

S100 preferably includes storing one or more receiver positions, carrier signal data (e.g., carrier phase measurements for each signal), the respective fixed integer carrier phase ambiguity, and/or any other suitable data for each timestamp, epoch, and/or other sampling basis. The data can be stored: indefinitely, until a new receiver position is determined, until a phase-lock loss event, until a reconvergence (e.g., during or after a phase-lock loss event), for a predetermined amount of time (e.g., 10 s, 30 s, 1 min, 2 min, 5 min, 10 min, 30 min, 1 hr, 2 hr, 4 hr, 8 hr, 12 hr, 24 hr, etc.), until signal reacquisition, responsive to data received from data sources, for as long as a data source remains in view, and/or for any suitable amount of time.

In a specific example, S100 can include: receiving satellite observations S120, receiving GNSS corrections S140, determining phase ambiguities S160, and calculating the receiver position S180. However, S100 can include any suitable steps. In related examples, S100 can determine the receiver position according to methods disclosed in U.S. Pat. No. 9,933,528, entitled "SYSTEMS AND METHODS FOR REAL TIME KINEMATIC SATELLITE POSITIONING" and filed on 12 Feb. 2015 and in U.S. Pat. No. 10,473,790, entitled "SYSTEMS AND METHODS FOR DISTRIBUTED DENSE NETWORK PROCESSING OF SATELLITE POSITIONING DATA" and filed on 19 Nov. 2018, each of which is incorporated herein in its entirety by this reference.

Receiving one or more satellite observations S120 preferably functions to measure (e.g., at the receiver, at reference stations, etc.) and/or access one or more set of satellite observations (e.g., carrier phase measurements, pseudorange measurements, code measurements, etc.) from one or more observed satellites. The satellite observations can be measured and/or received by a receiver, retrieved from a database (e.g., retrieve stored satellite observations; retrieve stored corrections; retrieve an almanac such as of weather conditions, tides, etc.; etc.), and/or be otherwise received. S120 can include receiving Doppler measurement data, sensor data, and/or any suitable data. The satellite observations can include signals from one or more satellite constellations. S120 can include detecting one or more predetermined events in the satellite observations. S120 can be performed by an observation monitor 261 (e.g., of a positioning engine) and/or by any suitable component.

The GNSS corrections (e.g., received in S140) are preferably determined by a corrections engine (e.g., of a computing system; based on reference station observations, based on almanac data, based on a model, etc.), but can be determined by the positioning engine (e.g., where the positioning engine receives the data to generate the corrections), the receiver, and/or by any suitable component. Corrections can be applied in response to (e.g., to correct): hardware bias, timing errors (e.g., satellite clock, receiver clock, reference station clock, etc.), atmospheric effects (e.g., ionosphere effects, tropospheric effects), relativistic effects, local effects (e.g., multipath errors), global effects, noise (e.g., outliers), and/or any suitable effects. In a specific example, reference station satellite observations can be used to correct the receiver satellite observations such as by calculating double differenced satellite observations. In a second example, effects (e.g., atmospheric effects) on satellite observations can be modelled. Based on the model, the satellite observations can be corrected. However, correcting the satellite observations can be performed in any suitable manner.

S160 can include: determining a set of floating phase ambiguity hypotheses, determining a set of integer phase ambiguity hypotheses from the set of floating phase ambiguity hypotheses, validating the set of integer phase ambiguities hypotheses, and/or any suitable steps. S160 can be performed by a carrier phase detection module monitor (e.g., of a positioning engine) and/or by any suitable component. In an illustrative example, S160 can include steps and/or be performed as disclosed in U.S. patent application Ser. No. 16/685,927 filed 15 Nov. 2019 entitled "SYSTEM AND METHOD FOR SATELLITE POSITIONING" and/or U.S. patent application Ser. No. 16/817,196 filed 12 Mar. 2020 entitled "SYSTEMS AND METHODS FOR REAL TIME KINEMATIC SATELLITE POSITIONING," each of which is incorporated in its entirety by this reference.

The set of floating phase ambiguity hypotheses are preferably determined using a filter (e.g., a float filter 263). The filter is preferably a Kalman filter. However, the filter can be an extended Kalman filter, an unscented Kalman filter, a Bierman-Thornton filter, a particle filter, Monte Carlo simulation, and/or any suitable mean-square error filter and/or sensor fusion algorithm. However, the set of floating phase ambiguity hypotheses can be otherwise determined.

Determining the set of integer phase ambiguity hypotheses can include reducing a correlation between ambiguities of the set of phase ambiguities (e.g., floating phase ambiguity hypotheses) and performing a search (e.g., a least squares search, an absolute value search, etc.) to identify possible integer phase ambiguities to include in the set of integer phase ambiguity hypotheses. For example, Least-Squares Ambiguity Decorrelation Adjustment (LAMBDA) algorithm, modified-LAMBDA (MLAMBDA) algorithm, LLL reduction algorithm, a whitening transformation, a coloring transformation, a decorrelation transformation, rounding, the Ambiguity Function Method (AFM), Fast Ambiguity Resolution Approach (FARA), Least-Squares Ambiguity Search Techniques (LSAST), integer bootstrapping, and/or any suitable decorrelation or reduction algorithm can be used to fix and/or identify integer phase ambiguities. The set of integer phase ambiguity hypotheses preferably includes integer phase ambiguities that satisfy a hypothesis criterion, but can include any suitable integer phase ambiguities. Example of hypotheses criterion include a threshold sum of least squares, a threshold sum of absolute differences, a threshold likelihood of the correct solution, and/or any suitable criterion. The set of integer phase ambiguity hypotheses can be determined by an integer fixing module 264, or any suitable module or component. However, the set of integer phase ambiguity hypotheses can be generated in any manner.

Validating the integer carrier phase ambiguities functions to determine an integrity score for and/or determine (e.g., select, identify) the most likely to be correct integer carrier phase ambiguity and/or determined receiver position. The integer carrier phase ambiguities can be validated in the position domain, in the measurement domain, and/or in any other suitable domain.

In a first variant, validating the integer carrier phase ambiguities can include performing hypothesis testing. The hypothesis test is preferably a Bayesian inference, but can additionally or alternatively be based on a statistical confidence, significance testing, and/or any suitable hypothesis testing. Examples of hypothesis tests can include difference test, ratio test, projector test, f-test GIA test, and/or any suitable hypothesis test. In an illustrative example, performing hypothesis testing can include determining a probability (e.g., a likelihood, a log likelihood, etc.) associated with subsets of integer phase ambiguities of the integer phase ambiguity hypotheses; computing a ratio of the probability between two subsets of integer phase ambiguities (e.g., within the same ambiguity set, across different ambiguity sets); when the ratio between a most-likely and a next most likely subset of integer phase ambiguities exceeds a threshold, storing the most-likely subset of integer phase ambiguities as the integer phase ambiguities and ceasing hypothesis testing. However, any hypothesis testing can be performed. Carrier phase ambiguities that pass the hypothesis test can be referred to as validated carrier phase ambiguities.

In a second variant, validating the integer carrier phase ambiguities can include validating the carrier phase ambiguities in a multi-step process. For example, in a first step, integer ambiguities for at least two satellite constellations (e.g., GPS and Galileo, GPS and GLONASS, GPS and BDS, Galileo and GLONASS, Galileo and BDS, GLONASS and BDS, etc.) can be validated simultaneously (e.g., by combining data from each satellite constellation. In a second step, the integer carrier phase ambiguities can validate (in parallel or sequentially) satellite observations corresponding to a first subset of satellite observations (e.g., associated with a first satellite constellation) independently of those corresponding to a second subset of the satellite observations (e.g., associated with a second satellite constellation). A third step can include repeating the second step one or more additional times (e.g., 2×, 3×, 5×, 10×, 20×, etc.). However, in the first, second, and/or third step, integer-valued carrier phase ambiguities corresponding to three or more satellite constellations, subsets of satellites within one or more satellite constellations (e.g., validating integer-valued carrier phase values for satellite observations for each satellite from a single satellite constellation, validating integer-valued carrier phase values for satellite observations for a first subset of satellites and a second subset of satellites corresponding to a single satellite constellation, validating integer-valued carrier phase values for satellite observations for each satellite from a plurality of satellite constellations, etc.), and/or any suitable satellite observations can be validated and/or validated any suitable number of times. However, the multistep validation process can otherwise be performed.

In a third variant, the carrier phase ambiguities can be validated as disclosed in U.S. patent application Ser. No. 17/119,823, filed 11 Dec. 2020, titled "SYSTEM AND METHOD FOR VALIDATING GNSS AMBIGUITIES" incorporated in its entirety by this reference.

In a fourth variant, the carrier phase ambiguities can be validated by combining two or more of the preceding variants. The carrier phase ambiguities are preferably validated using a validation module 265, but can be validated using any suitable module. However, the carrier phase ambiguities can be otherwise validated.

The receiver position is preferably calculated (e.g., in S180) according to a measurement model (e.g., before phase lock loss). S180 can be performed by a position module 267 (e.g., of a positioning engine) and/or by any suitable component. In an illustrative example, the measurement model can be:

$$\lambda \varphi_j^i(t) = r_i + \delta t^i + \delta t_j - I + \lambda N_j^i(t) + \varepsilon_\varphi,$$

where $\lambda$ is the wavelength of the signal (e.g., $L_1$, $L_2$, $L_5$, $E_1$, $E_2$, $E_{5a}$, $E_{5b}$, $E_6$, $G_1$, $G_3$, etc. wavelengths; differenced wavelengths such as $L_1$-$L_2$, $L_1$-$L_5$, $G_1$-$G_3$, etc.; narrow-lane wavelengths; etc.), $\varphi_j^i(t)$ is the phase for receiver j corresponding to satellite i at time t, r is distance between the receiver and satellite i, $\delta t^i$ is the clock error for satellite i, $\delta t_j$ is the clock error for receiver j, I includes atmospheric effects (e.g., ionosphere, troposphere, etc.), $N_j^i(t)$ is an integer phase ambiguity corresponding to satellite i and receiver j, and $\varepsilon_\varphi$ is noise. However, the measurement model can include more terms, fewer terms, and/or different terms. However, any suitable measurement model can be used and/or the receiver position can otherwise be calculated.

In some embodiments, S100 can include determining a velocity of the receiver and/or an integrity associated with the velocity of the receiver. The velocity can be determined based on the satellite observations, time differenced carrier phase measurements, Doppler shift data, pseudorange, differential estimated position, and/or otherwise be determined. The velocity and/or the integrity of the velocity is preferably determined using a velocity filter, but can be determined using a position module 267, a dead reckoning module 269, or any suitable component.

In a specific example, the position of the receiver can be determined as disclosed in U.S. patent application Ser. No. 17/022,924 filed on 16 Sep. 2020 titled 'SYSTEMS AND METHODS FOR HIGH-INTEGRITY SATELLITE POSITIONING" incorporated in its entirety by this reference. However, S100 can be performed in any manner.

Detecting a phase-lock loss event S200 can function to determine that phase-lock loss event has occurred. S200 can be performed before, during, and/or after S100. S200 preferably occurs after the receiver position has been determined with a high integrity, but S200 can occur before the receiver position is known to a high integrity. S200 can be performed by a single frequency cycle slip detector, a double frequency cycle slip detector, a triple frequency cycle slip detector, an outlier detector 268 (e.g., of a positioning engine), a receiver, a reference station, and/or by any suitable module or component. For example, S200 can include: determining that one or more satellite signals corresponding to one or more satellites (and/or satellite constellations) was not detected, determining that a power state has changed (e.g., power outage, power surge, etc.), determining that one or more satellite signals was incomplete, determining that a network connection has changed (e.g., low bandwidth, disconnected, etc.), and/or any suitable steps.

In variants, S200 can include: optionally identifying the source of the phase-lock loss event (e.g., obstruction such as cause of the obstruction, power failure, etc.), storing the location of the phase-lock loss event (e.g., on a map such as to identify locations where phase-lock loss can be predicted to occur), detecting that the source of the phase-lock loss event is no longer present (e.g., that the satellite(s) are no longer obstructed, that normal power is restored, etc.), and/or can include any suitable steps.

Determining the receiver position based on dead reckoning S300, preferably functions to determine (e.g., calculate, estimate, model, etc.) the receiver position (and an associated covariance) when GNSS positioning is not available (e.g., during the phase-lock loss period, example as shown in FIGS. 5A and 5B, etc.). However, S300 can be performed when GNSS positioning is available (for example, to estimate a sensor bias by comparing the result for the GNSS position with the results from dead reckoning; to provide redundancies in the determination of the receiver position; etc.) and/or be performed with any suitable timing. S300 is preferably performed by a computing system (e.g., a dead reckoning module of a positioning engine, by a secondary positioning system, etc.), but can be performed by a receiver, sensors, and/or any suitable component. S300 can be performed after, before, and/or during S100 or S200 (e.g., in response to S200, in parallel with S100, etc.). S300 is preferably performed at least for the duration of the phase-lock loss period (e.g., obscuration time, reacquisition time, reconvergence time, etc.). However, additionally or alternatively, S300 can be performed continuously (e.g., during operation of the receiver, during operation of the external system), before phase-lock loss event, after phase-lock loss event, simultaneously with S100 (and/or S500), and/or at any suitable time. S300 is preferably used in isolation (e.g., without GNSS position estimates being generated simultaneously) for at most 20 seconds (e.g., 1 s, 2 s, 3 s, 4 s, 5 s, 7 s, 10 s, 15 s, etc.), but S300 can be used for longer than 20 seconds (e.g., during partial obscuration events where a threshold number of satellites remain in view of the receiver).

The receiver position determined in S300 typically has a mid-integrity level (for the phase-lock loss duration, such as a TIR<$10^{-4}$/hour and/or a PL of about 5), but can have a high integrity, low integrity, unknown integrity, and/or any suitable integrity. Typically, but not always, when the integrity of the receiver position determined in S300 is below a threshold integrity (e.g., TIR>$10^{-4}$/hour), the method is restarted (e.g., from S100 once satellite observations become available).

S300 can use any suitable dead reckoning techniques and/or combination thereof to determine the receiver position. In a series of examples, S300 can use visual odometry, visual-inertial odometry, integration of inertial measurements (e.g., speed, acceleration, rotational velocity, etc.), mechanical odometry (e.g., wheel odometry, motor odometry), LIDAR, and/or any suitable dead reckoning technique can be used. The receiver position in S300 can be determined based on: previous receiver position (e.g., receiver position determined from GNSS, last receiver position before phase-lock loss event, receiver position determined in S100, etc.), sensor data (e.g., images, LIDAR, IMU data, speed, direction, velocity, acceleration, etc.), sensor bias (e.g., modelled, estimated, etc.), and/or any suitable data inputs. The receiver position can be determined using: an equation (e.g., wherein the position change calculated from the sensor data is added to the prior location); a filter (e.g., a Kalman filter or Bayesian filter that estimates the current position as a hidden state); and/or any other suitable method. The receiver position in S300 can include estimated error (e.g., uncertainty) in the receiver position.

In some embodiments, S300 can additionally or alternatively include determining a velocity of the receiver and/or an integrity associated with the velocity based on the sensor measurements.

In variants, the method can include determining that the GNSS outage has ended S250. S250 preferably functions to determine that the source of the GNSS outage has been resolved (e.g., satellites are no longer obscured from the receiver, reference stations are no longer obscured from the receiver, power is restored, network connection returned, etc.). S250 can be performed in the same and/or a different manner (e.g., in an inverse manner) as S200. S250 preferably occurs during S300, but S250 can occur before and/or after S300.

Figure 6:
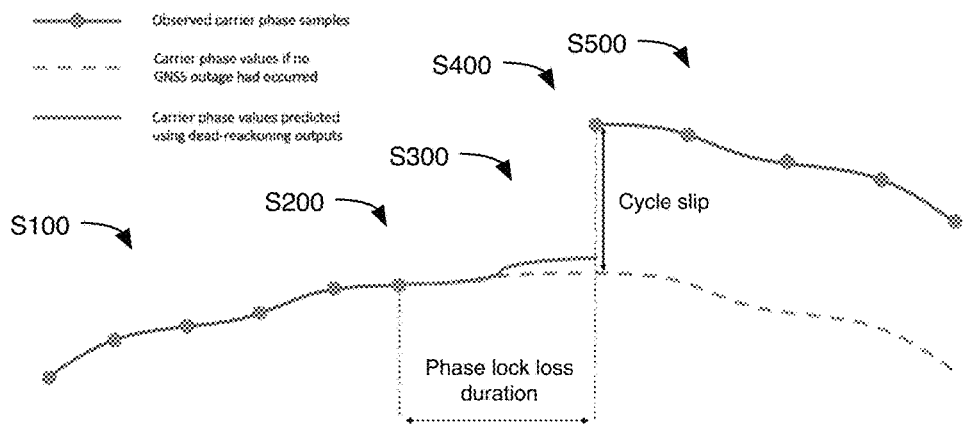
FIG. 6 is a schematic representation of an example of determining a mobile receiver position after a GNSS outage.

Determining one or more satellite observation discontinuities S400 functions to estimate satellite observation discontinuities to facilitate determination of the current or updated receiver position using GNSS techniques (e.g., for use in S500). The satellite observation discontinuities preferably refer to cycle slips (e.g., jumps or changes in the carrier phase ambiguity generally by an integer value as shown for example in FIG. 6; also referred to as integer ambiguity jumps), but can additionally or alternatively refer to range discontinuities, code discontinuities, multipath errors, and/or any suitable discontinuities. S400 can be performed during or after a phase lock loss duration. For instance, S400 can be performed during a reconvergence time of a phase lock loss duration (e.g., after one or more epochs of carrier phase signals are received post-outage). S400 can be performed by a reconvergence module (e.g., of a positioning engine, a residual filter of a reconvergence module, etc.), and/or by any suitable module or component. However, S400 can be performed with any timing.

S400 can be performed for one or more sampling epochs after phase lock is regained but before the resultant position estimate is used (e.g., iteratively performed for successive epochs until the integrity reaches a predetermined threshold), or be otherwise used. S400 is preferably performed by a computing system (e.g., a positioning engine such as a reconvergence module 266, a carrier phase ambiguity module 262, or other suitable module of the positioning engine), but can be performed by the receiver, the sensor(s), and/or any suitable component.

The satellite observation discontinuities are preferably determined in the measurement domain, but can be determined in the position domain, in a mixed or mixture of domains, and/or in any suitable domain. The satellite observation discontinuities can be determined for all satellites associated with observations in the set of satellite observations, the set of satellites that signal was lost for during the phase lock loss duration, satellites associated with particular satellite constellations, the set of satellites that signal was not lost for during the phase lock loss duration, and/or any suitable satellites. The satellite observation discontinuities can be determined based on: current carrier phase measurements, estimated carrier phase (e.g., estimated from sensor data, estimated from a change between the current receiver position and the receiver position before the phase lock loss period, etc.), current receiver position (e.g., determined using dead reckoning, relative to a receiver position before the phase lock loss period, estimated from the satellite observations, etc.), a previous receiver position (e.g., before the phase lock loss period), satellite code data, satellite pseudorange data, and/or using any suitable data or information.

In general, signal from at least one satellite (and preferably more than one) of the set of satellites is preferably not lost during the phase lock loss duration. However, different satellites can each be available during the phase lock loss duration (e.g., signal can be received from a first satellite for a first time period, signal can be received from a second time period and so on, where the different time periods preferably but do not necessarily overlap), and/or signal from all satellites can be lost (for all or a portion of the phase lock loss duration). When signal from at least one satellite is not lost, that satellite can be used as a reference satellite, for instance, to estimate (and thereby correct or otherwise account for) one or more states (e.g., which can include orbital errors, clock errors, atmospheric errors, receiver position, etc.), to determine the estimated carrier phase discontinuity, to calculate the integer carrier phase ambiguity, and/or otherwise be used. For example, phase observations from continuously phase locked-satellites can be used to determine a new state (e.g., global or shared errors, such as clock error, orbital errors, etc.), which can be used to reduce the residual variance when determining the integer ambiguity of the lost-phase-lock satellite. When no satellites are available during the phase lock loss duration, then S400 can include constraining the errors (e.g., clock, orbital, atmospheric, etc. errors), modelling the errors, estimating the errors based on other data sources, calculating a differenced cycle slip (e.g., based on differenced satellite signals), using a different reconvergence method (e.g., not using dead reckoning to bootstrap reconvergence), and/or otherwise perform the calculations and/or verification.

S400 preferably includes determining the satellite observation discontinuities based on the dead reckoning position (e.g., as determined in S300) and validating the satellite observation discontinuities. However, S400 can include any suitable steps.

The satellite observation discontinuities are preferably determined without tightly coupling the dead reckoning position and the satellite observations (e.g., without providing the dead reckoning position and/or underlying sensor measurements and the satellite observations to a filter that calculates the satellite observation discontinuity). However, the satellite observation discontinuities can be determined using a tight coupling model, and/or using any suitable model.

Determining the satellite observation discontinuities can include determining a residual between an estimated carrier phase and a measured carrier phase, a residual between different estimated receiver positions, a residual between an estimated float ambiguity and a measured float ambiguity, and/or other residual. The residual can be (and/or be related to such as according to an equation) the satellite observation discontinuity. For example, the residuals between the estimated carrier phase and the measured carrier phase (or associated float carrier ambiguities) can be used as the cycle slip estimate. The residual is preferably rounded to the nearest integer; however, an integer search can be performed on the residual, the residual can be used without rounding, and/or the residual can otherwise be used. The residual can be determined based on: an estimated carrier phase, a measured carrier phase, the new state, a design matrix, and/or any other suitable information.

Figure 9A:
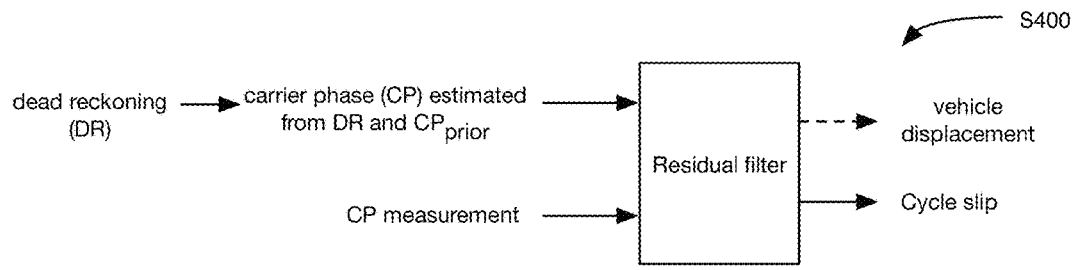
FIGS. 9A, 9B, and 9C are schematic representations of examples of determining the cycle slip that occurs during a phase lock loss duration.

In a first variant, as shown in FIG. 9A, determining the satellite observation discontinuity can include: estimating the current carrier phase from the current receiver position (e.g., determined using dead reckoning, such as from S300), the covariance in the current receiver position, the previous receiver position (e.g., determined using GNSS techniques such as from S100), and/or the previous carrier phase measurement using a measurement model.

Figure 9B:
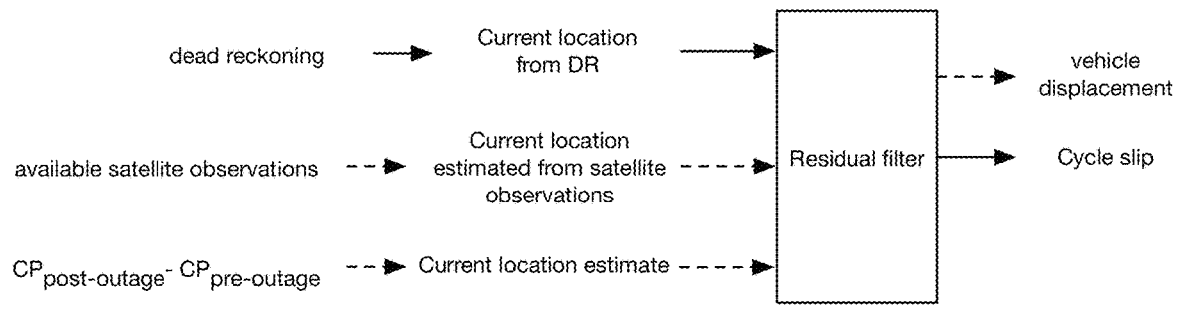

In a second variant, as shown in FIG. 9B, determining the satellite observation discontinuity can include: determining the current receiver position (e.g., using dead reckoning such as from S300) and estimating the current receiver position based on a difference between the previous carrier phase measurement (from before the phase lock loss event) and the current carrier phase measurement (e.g., from after the phase lock loss duration) using a measurement model. Additionally or alternatively, the current location determined from auxiliary satellites (that were available during the phase lock loss duration) can be used in addition to and/or in lieu of the current receiver position determined from dead reckoning.

Figure 9C:
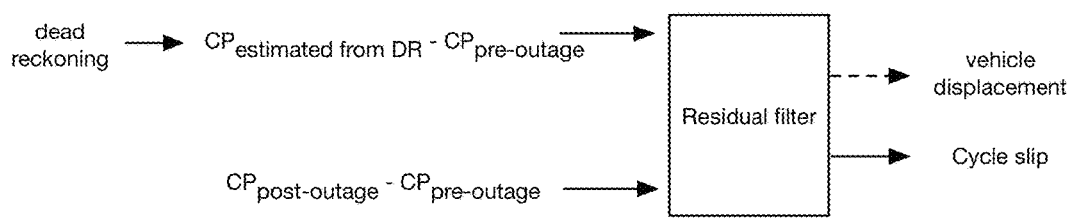

In a third variant, as shown in FIG. 9C, determining the satellite observation discontinuity can include: estimating the carrier phase difference between a carrier phase determined using dead reckoning (e.g., as described in the first variant) and the measured carrier phase, and determining the carrier phase difference between the current measured carrier phase and the carrier phase measured before the phase lock loss event.

In a specific example, the satellite observation discontinuity can be determined by calculating the a priori residuals for the phase observations with possible cycle slips by processing satellite observations (e.g., code and carrier phase) associated with satellites that did not lose phase lock during the phase lock loss duration and determining (e.g., calculating, estimating) residuals for the set of satellites that lost phase lock based on the new states (e.g., determined from and/or including the processed satellite observations associated with satellites that did not lose signal, the current position of the receiver, the change in position of the receiver during the phase lock loss, satellite observations prior to phase lock loss, etc.) and a design matrix.

However, the satellite observation discontinuity can otherwise be determined.

Validating the satellite observation discontinuity can include performing a statistical analysis or statistical test on the determined satellite observation discontinuity, comparing the residual to a threshold, comparing a covariance around the residual to a threshold, comparing the cycle slip variance to a threshold, comparing the estimated satellite observation discontinuities with the satellite carrier phase ambiguities from satellites that did not lose phase lock (e.g., satellites that did not experience an outage), comparing independently (or dependently) generated satellite observation discontinuities (e.g., two independently generated estimates of the satellite observation discontinuity associated with a satellite), modelling the satellite observation discontinuities, comparing an estimated satellite carrier phase with the measured satellite carrier phase, comparing the residual variance with a threshold, and/or otherwise be validated.

In some embodiments, particularly but not exclusively when the positioning engine operates in a high integrity mode and/or to achieve a high integrity receiver position in step S500, the satellite observation discontinuities can be independently validated for subsets of the satellite observations. For example, the cycle slip can be independently validated for a first satellite constellation (e.g., GPS) and a second satellite constellation (e.g., Galileo). However, the subsets of satellite observations can include any suitable satellites (e.g., a first and second subset of GPS satellites) and/or any suitable satellite constellations.

In a first variant, when the residual (e.g., a difference between the residual and the nearest integer) is sufficiently close to zero (e.g., a distance between the residual and an integer is less than a threshold such as $1/2$, $1/3$, $1/4$, $1/5$, $1/6$, $1/8$, $1/10$, $1/20$, $1/50$, $<1/100$, values between them, etc.), the satellite observation discontinuity can be validated. For example, a residual can be sufficiently close to zero when the residual (e.g., the non-integer part of the residual, the difference, etc.) is less than a multiple (e.g., 1×, 2×, 3×, etc.) of the residual standard deviation (or variance). The first variant can function to ensure that the residual is a satellite observation discontinuity such as a cycle slip (e.g., as opposed to another type of outlier), but can otherwise function.

In a second variant, when the standard deviation of the residual is less than a threshold standard deviation (e.g., 0.2, 0.3, 0.5, 0.7, etc.), then the satellite observation discontinuity can be validated. For example, the threshold standard deviation can be 1 cycle length such as $1/2$, $1/3$, $1/4$, $1/5$, $1/6$, $1/8$, $1/10$, $1/20$, $1/50$, $<1/100$, of a cycle length or values between them. The second variant can function to correctly choose the cycle slip (e.g., the correct or actual value of the integer ambiguity jump), and/or otherwise function.

In the first and second variants, the thresholds can be fixed (e.g., independent of the position engine mode), depend on the positioning engine mode (e.g., a tighter or smaller threshold for higher integrity modes), depend on a target receiver position integrity (after reconvergence, after phase lock loss, etc.), and/or otherwise be determined.

However, the satellite observation discontinuities can otherwise be validated.

Typically, validated satellite observation discontinuities are provided to S500 where the validated satellite observation discontinuities can be used to determine the receiver position. However, not validated satellite observation discontinuities can additionally or alternatively be provided to S500 (e.g., where the unvalidated satellite observation discontinuities can be used to determine the receiver position).

When the satellite observation discontinuities are not validated, the method can be restarted (e.g., restart S100), additional satellite observation discontinuities can be determined (e.g., using the same input data, using different input data, using the same methods, using different methods, etc.), and/or any suitable response can occur.

Determining a second receiver position based on GNSS techniques S500, preferably functions to determine the receiver position using GNSS data (e.g., satellite signals, reference station signals, etc.). S500 preferably occurs after a phase-lock loss period has ended (e.g., after the obscuration time, after the reacquisition time, after the GNSS outage period, etc.), but can be at any suitable timing. S500 is preferably performed by a computing system (e.g., a positioning engine), but can be performed by a receiver and/or any suitable component.

S500 is preferably performed as described in S100, without resolving (e.g., as described in S160) the carrier phase ambiguities (e.g., because the carrier phase ambiguity can be determined from the satellite observation discontinuity as determined in S400). However, S500 can be performed in the same manner as described in S100, as described in S100 without validating or fixing the carrier phase ambiguities, in a different manner from that described in S100, and/or in any manner.

In an illustrative example, S500 can include receiving a set of satellite observations (e.g., a set of satellite observations used to determine the satellite observation discontinuity, a set of satellite observations received after the satellite observation discontinuity has been determined, a set of satellite observations determined after reconvergence, etc.), modifying the set of satellite observations to account for the satellite observation discontinuity (e.g., as determined in S400, as validated in S400, etc.), and calculating the receiver position using a measurement model. However, the measurement model can be modified to account for the satellite observation discontinuity (e.g., instead of modifying the satellite observations) and/or the receiver position can otherwise be determined.

When a validated satellite observation discontinuity is used, the receiver position integrity (and/or accuracy) can be the same as before the phase lock loss event, can depend on the mode of the positioning engine, can depend on the validation of the satellite observation discontinuity, can depend on how the satellite observation discontinuity was determined, can depend on the duration of the phase lock loss (or subset thereof such as reconvergence time), can depend on the number of measurements in the set (or subset) of satellite observations, can depend on the sensor data (e.g., type of sensor used to generate the data, sensor bias, etc.), and/or can otherwise be determined. When the integrity of the receiver position is less than a target integrity, S500 can include performing additional validation tests (e.g., additional steps of a multi-step validation) on the carrier phase ambiguities and/or on the satellite observation discontinuities (e.g., cycle slip) to improve the integrity. For instance, when S500 determines a receiver position with a TIR of about $10^{-4}$/hour, S500 can include performing a third validation step for the carrier phase ambiguity (as disclosed above) to achieve a receiver position with a TIR of about $10^{-7}$/hour. However, S500 can additionally or alternatively improve the integrity of the receiver position using one or more process as disclosed in U.S. patent application Ser. No. 17/022,924 filed on 16 Sep. 2020 titled 'SYSTEMS AND METHODS FOR HIGH-INTEGRITY SATELLITE POSITIONING" incorporated in its entirety by this reference, by operating the reconvergence module in a higher integrity mode (e.g., relative to the mode used to establish the positioning value), and/or otherwise improve the integrity of the solution.

When unvalidated satellite observation discontinuities are used in S500, the receiver position integrity and/or accuracy is generally unspecified (or unknown). However, the integrity of the receiver position can be known or estimated when unvalidated satellite observation discontinuities are used. When unvalidated satellite observation discontinuities are used, S500 can include: performing one or more process to generate a high integrity receiver position (e.g., as discussed above), determining (e.g., calculating) the receiver position integrity, repeating S100, and/or any suitable steps.

S600 can include determining an external system (e.g., vehicle) position (and/or location) and/or velocity based on the receiver position and/or velocity (e.g., from S100, S300, S500, etc.). The external system position can be determined based on a transformation from a receiver coordinate to an external system coordinate, based on a known relative position of the receiver to the external system, and/or otherwise be determined. The external system position can be a relative position (e.g., relative to the receiver, relative to a reference location, relative to a sensor, relative to a center of mass of a plurality of sensors, relative to a center of mass of one or more receivers and sensors, etc.) and/or an absolute position (e.g., coordinates). The external system position is preferably determined based on a high integrity receiver position, but can be determined based on a mid-integrity, low-integrity, unknown integrity, and/or any suitable integrity receiver position.

S600 can include generating instructions for operation of the external system based on the external system location and/or operating the external system (e.g., according to the operation instructions. For example, operation instructions for a vehicle can include making lane adjustments to remain within a lane of traffic, turning instructions, and/or other instructions for traversing a path, obeying laws, guiding an external system (and/or a user or occupant thereof), delivering a payload (e.g., to a target location), and/or other purposes.

5. Specific Examples

Figure 4:
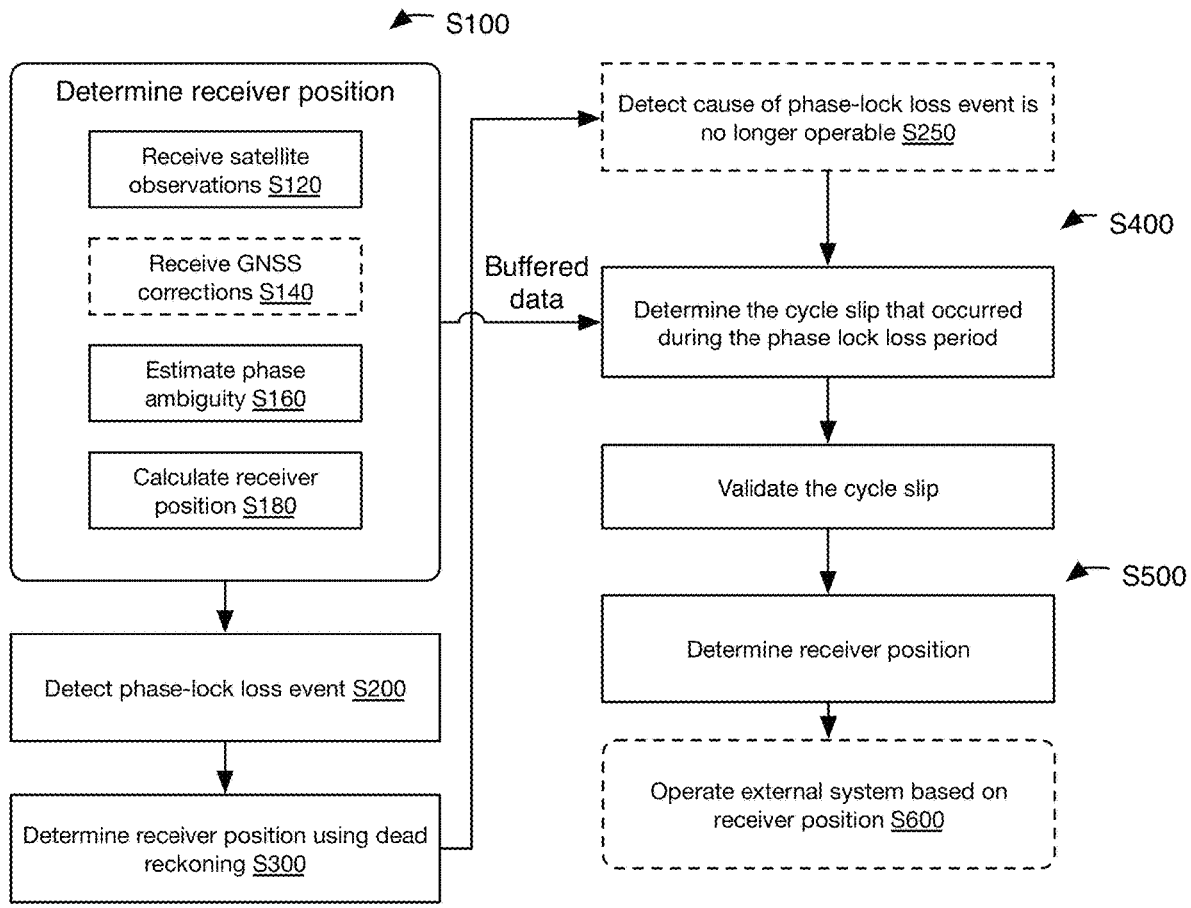
FIG. 4 is a flow chart representation of an example of the method.

In a specific example, as shown in FIG. 4, the method can include: determining a first receiver position using GNSS positioning techniques; during a satellite signal outage (e.g., during a phase-lock loss period), determining the receiver position based on sensor signals (e.g., using dead reckoning); after the satellite signal outage (e.g., satellites are no longer obstructed, power is restored to system, etc.), determining a cycle slip based on the GNSS position before the satellite signal outage and the current receiver position (e.g., determined using dead reckoning); validating the cycle slip; determining the receiver position based on the validated cycle slip; optionally, transmitting the receiver position (and integrity); optionally, operating an external system based on the receiver position, and/or any suitable steps. Determining the receiver position using GNSS positioning techniques can include: receiving data from a plurality of satellites, receiving reference station data, estimating a carrier phase ambiguity (e.g., float ambiguity, integer ambiguity), and calculating the receiver position based on the estimated phase ambiguity. However, the method can include any suitable steps.

Figure 8:
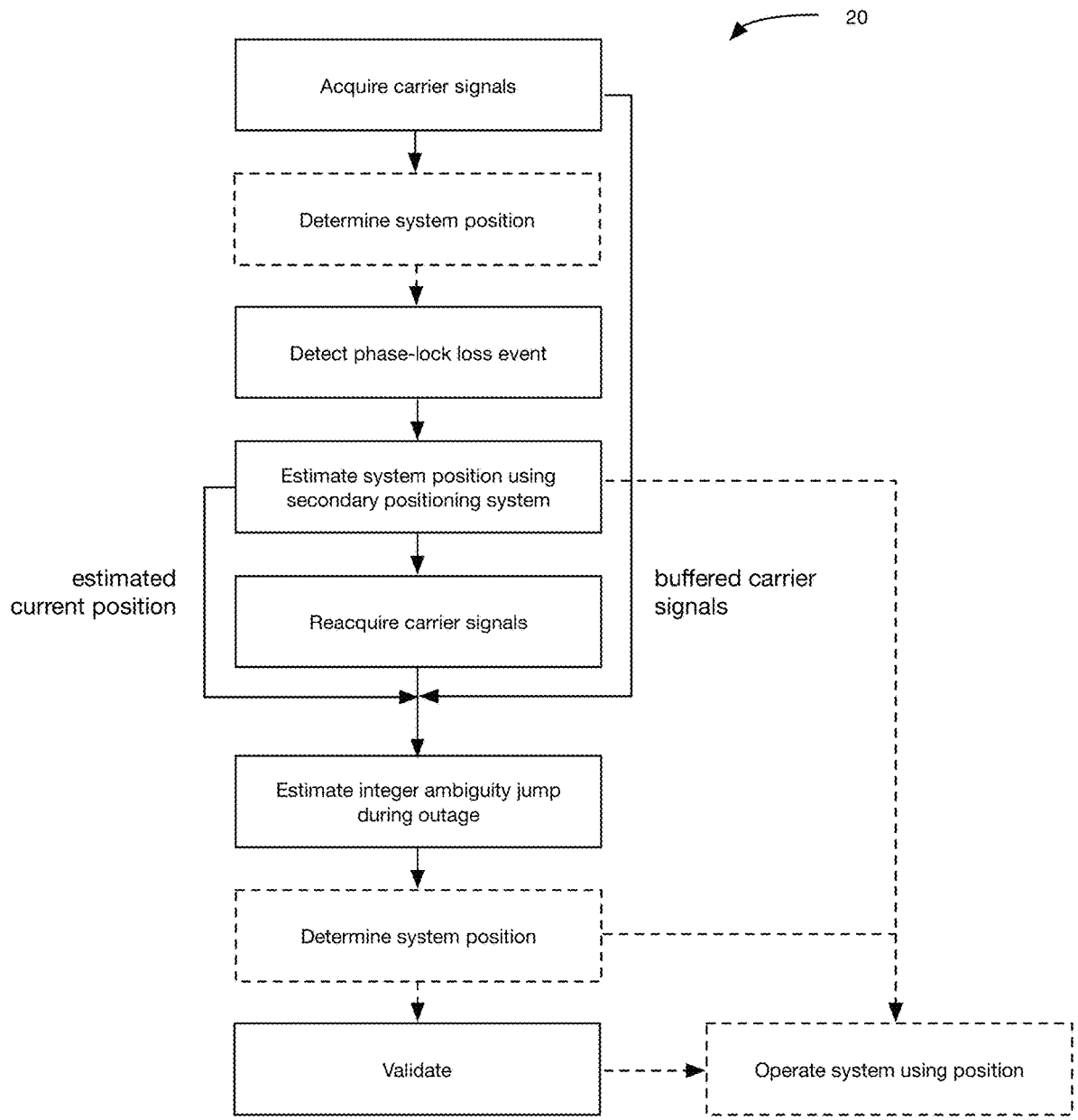
FIG. 8 is a schematic representation of a specific example of the method.

In a second specific example, as shown in FIG. 8, the method can include acquiring carrier signals; determining the receiver and/or external system position based on the carrier signals; detecting a phase-lock loss event; during the phase-lock loss period, estimating the system position using a secondary position system (e.g., dead reckoning); reacquiring carrier signals; using the estimated system position and the buffered carrier signals, estimating the change in the integer ambiguity during the GNSS outage; determining the system position; validating the integer ambiguity; and operating the (external) system based on the system position.

The methods of the preferred embodiment and variations thereof can be embodied and/or implemented at least in part as a machine configured to receive a computer-readable medium storing computer-readable instructions. The instructions are preferably executed by computer-executable components integrated with a system for GNSS PVT generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for determining a receiver position after a phase lock loss event, comprising:
   before the phase lock loss event, determining a first high integrity receiver position based on a first set of satellite observations;
   during a phase lock loss period following the phase lock loss event, determining the receiver position based on IMU measurements;
   after the phase lock loss period, determining a cycle slip between the first set of satellite observations and a second set of satellite observations measured after the phase lock loss period based on:
     the receiver position determined based on the IMU measurements during the phase lock loss period; and
     the first high integrity receiver position prior to the phase lock loss event; and
   when a standard deviation of the cycle slip is less than a standard deviation threshold, determining a second high integrity receiver position using the cycle slip
   wherein determining the cycle slip comprises:
     estimating a current carrier phase using the receiver position determined based on the IMU measurements and the first high integrity receiver position;
     determining a residual between the estimated carrier phase and the second set of satellite observations; and
     determining an integer nearest to the residual, wherein the integer is the cycle slip.

2. The method of claim 1, wherein the first high integrity receiver position comprises an integrity risk of at most $10^{-7}$ per hour and a protection level that is at most 3 m.

3. The method of claim 1, wherein the second high integrity receiver position comprises an integrity risk of at most $10^{-4}$ per hour and a protection level that is at most 1 m.

4. The method of claim 1, wherein the second high integrity receiver position comprises an integrity risk of at most $10^{-7}$ per hour and a protection level that is at most 3 m.

5. The method of claim 1, wherein determining the first high integrity receiver position comprises:
   receiving the first set of satellite observations from a set of global navigation satellites;
   resolving a carrier phase ambiguity for the first set of satellite observations;
   validating the carrier phase ambiguity using a multistep validation process;
   estimating a position of the GNSS receiver based on the validated carrier phase ambiguity, wherein an integrity risk and a protection level of the estimated position depend on which step of the multistep validation process is used to validate the carrier phase ambiguity.

6. The method of claim 5, further comprising: receiving validated corrections from an external server, wherein the carrier phase ambiguity is resolved based on the validated corrections.

7. The method of claim 1, wherein determining the second high integrity receiver position comprises determining the second high integrity receiver position without resolving the carrier phase ambiguity.

8. The method of claim 1, wherein the cycle slip is determined without tightly coupling the first set of satellite observations and the IMU measurements.

9. The method of claim 1, wherein the standard deviation threshold is at most ⅓ of a cycle.

10. The method of claim 1, wherein the phase lock loss duration is at most 10 seconds.

11. A method for determining a receiver position after a phase lock loss event, comprising:
    before the phase lock loss event, determining a first high integrity receiver position based on a first set of satellite observations comprising:
      receiving the first set of satellite observations from a set of global navigation satellites;
      resolving a carrier phase ambiguity for the first set of satellite observations;
      validating the carrier phase ambiguity using a multistep validation process;
      estimating a position of the GNSS receiver based on the validated carrier phase ambiguity, wherein an integrity risk and a protection level of the estimated position depend on which step of the multistep validation process is used to validate the carrier phase ambiguity,
    during a phase lock loss period following the phase lock loss event, determining the receiver position based on IMU measurements;
    after the phase lock loss period, determining a cycle slip between the first set of satellite observations and a second set of satellite observations measured after the phase lock loss period based on:
      the receiver position determined based on the IMU measurements during the phase lock loss period; and
      the first high integrity receiver position prior to the phase lock loss event; and
    when a standard deviation of the cycle slip is less than a standard deviation threshold, determining a second high integrity receiver position using the cycle slip.

12. The method of claim 11, further comprising: receiving validated corrections from an external server, wherein the carrier phase ambiguity is resolved based on the validated corrections.

* * * * *